Patented Aug. 17, 1926.

1,596,218

UNITED STATES PATENT OFFICE.

SRINIVAS RAM WAGEL, OF NEW YORK, N. Y., ASSIGNOR TO THE LEHIGH COAL AND NAVIGATION COMPANY, A CORPORATION OF PENNSYLVANIA.

BRIQUETTE AND PROCESS OF MAKING THE SAME.

No Drawing.  Application filed November 8, 1924. Serial No. 748,761.

The invention relates to a process of briquetting coal by the use of bituminous material such as asphalt, heavy oil, coal tar, etc., combined with clay to make up a binder which is mixed up with the coal particles, and the mixture molded into briquette form.

This application contains certain subject matter disclosed in my prior application Serial No. 696,902, filed March 4, 1924, entitled Processes of briquetting coal, forfeited on October 18th, 1924, and renewed on November 3rd, 1924.

One important object of the invention is to provide a process of the above nature whereby the operations of properly preparing the binder may be materially shortened and improved. It is at best a lengthy and difficult matter to secure emulsions or thorough dispersions involving clay and bituminous material by agitation alone, and in fact with most available clays it is practically impossible to obtain a thorough dispersion of the above nature, in this manner, even after several hours of agitation, since most clays will not disperse properly and the bitumen will separate out.

According to the present invention a blending agent is employed which enables an emulsion or thorough dispersion of clay and bituminous material to be obtained by a relatively short period of agitation, the process being applicable to clays in general, and reliable as regards the results secured, thereby enabling briquettes to be produced more cheaply and in shorter time, and insure that they will be more uniformly bonded.

I have found that acids in general possess the qualities necessary to the blending agent above described, sulfuric acid being usually the most preferable from the standpoint of cost and efficient action, although other acids such as hydrocloric acid, citric acid, can be employed to somewhat less advantage. Furthermore, the blending agent may consist of an acidified oil formed by mixing the acid with certain oils, instead of using the acid alone.

The invention is illustrated as applied to the briquetting of coal by a binder made up of asphalt and clay although, as above stated, other bituminous materials can be used, or other ingredients added to the binder if desired.

I first produce an intimate and thorough dispersion or suspension of clay in water, using about 50% more water than clay, for example, I may use 17 parts of clay and 25 parts of water by weight, the two being stirred together and heated to about 200° F., and to this I add a small proportion of the blending agent. Where acidified oil is employed as a blending agent, sulfuric acid (98%) may be added to an asphalt base oil of about 12° to 16° Bé., using about equal parts by weight. With asphalt base oil, there is considerable action of the acid on the oil and usually the formation of a precipitate. This precipitate I discard.

The acidified oil is then added to the hot clay water suspension in the proportions of about 1½% to 2% of the finished composition, and well stirred thereinto. Next I may add a little milk of lime, say, ½% of the finished composition, the milk of lime being of such consistency as to show from 20° to 25° Bé. This milk of lime thickens the mixture somewhat and neutralizes most of its acidity.

I next introduce the asphalt into the suspension above-mentioned, using enough to make about 50% of the composition. I usually employ oil asphalts, that is, asphalts made by special treatments of petroleum. An asphalt of 90° to 100° penetration is suitable for the present purposes. In order to get rid of volatile, smoke forming components in the asphalts, and for other reasons, I usually and very advantageously heat it to about 600° F. preliminarily; keeping it at this temperature about one-half hour. Heating may be done in any ordinary type of fire heated still or kettle. The vapors evolved may be condensed and used for other purposes, if desired. The hot asphalt is best cooled to not below 212° F. In heating, the asphalt loses its viscosity to a large extent and the lost viscosity does not quickly return in full measure on again cooling. With an oil heated to 600° F., on cooling to 212° F. for a time the viscosity is less than that normal to the same asphalt at 212° F.

The asphalt, which has been heated and cooled as described, is added to the compound carrier described and vigorous agitation effected. Usually I aim to stir the asphalt and carrier together for about 30 minutes. After the emulsion or suspension is complete, I customarily add more hot water;

about 16.5% of water with the proportions stated; that is in a composition containing in a finished state about 40% asphalt. I find it is expedient not to add all the water I desire shall occur in the finished composition to the mixture in the first stages of making the compound clay-water carrier.

Where sulfuric acid alone, for example, is employed as a blending agent, the process is generally the same as above described except that from 1% to 2% by weight of the finished composition of sulfuric acid is added to the clay water suspension, instead of the proportions of acidified oil above-mentioned.

The binder made as so described is incorporated while warm or hot, say, at about 100° F., with coal dust or fines of any desired kind and the mixture formed into briquettes in the usual way, being thereafter dried if necessary. I find that there is required from 8% to 10% of a binder made as described and carrying about 40% asphalt for binding coal. About 8% is the usual proportion. With 8% of a 40% emulsion in briquettes, the amount of asphalt on the briquette is about 3.2%. This small amount of 3.2% gives us as much binding power as 8% to 10% of the original asphalt, while the briquette produced is much less smoky and much more permanent against deformation under the action of heat.

As stated, the suspension or emulsion made with the aid of the blending agent produces the binder much more rapidly and uniformly, with the result that the briquettes are reliably and strongly bonded.

While certain specific embodiments of the invention have been described, it will be obvious that many changes may be made therein without departing from its principles, as defined in the appended claims.

What I claim is:—

1. In the manufacture of coal briquettes, the process which comprises binding fine coal by an emulsion of asphalt and clay stabilized by a blending agent.

2. In the manufacture of coal briquettes, the process which comprises preparing a suspension of clay in water, adding acidified oil thereto as a blending and stabilizing agent, emulsifying asphalt in the suspension and briquetting coal therewith.

3. As a new article, coal briquettes containing coal bonded with an asphalt clay emulsion.

4. As a new composition of matter, coal briquettes containing coal bonded with aqueous suspension of bituminous material and clay, said suspension including a blending agent.

5. As a new composition of matter, coal briquettes containing coal bonded with aqueous suspension of bituminous material and clay, said suspension including an acid to act as a blending agent.

6. As a new composition of matter, coal briquettes containing coal bonded with an asphalt clay emulsion formed with the aid of a blending agent.

7. As a new composition of matter, coal briquettes containing coal bonded with an asphalt clay emulsion formed with the aid of an acid as a blending agent.

8. In the manufacture of coal briquettes, the process which comprises preparing an aqueous suspension of clay, mixing therewith bituminous material in liquid form, in the presence of a blending agent adapted to effect a uniform and dispersed condition in the suspension, and briquetting coal therewith.

9. In the manufacture of coal briquettes, the process which comprises preparing an aqueous suspension of clay at a temperature somewhat below the boiling point of water, mixing therewith bituminous material in liquid form, in the presence of an acid, and briquetting coal therewith.

In testimony that I claim the foregoing, I have hereunto set my hand this 31st day of October, 1924.

SRINIVAS RAM WAGEL.